(12) United States Patent
Morisaki

(10) Patent No.: US 7,911,661 B2
(45) Date of Patent: Mar. 22, 2011

(54) IMAGE READING DEVICE

(75) Inventor: Hiroshi Morisaki, Aichi (JP)

(73) Assignee: Brother Kogyo Kabushiki Kaisha, Nogoya-shi, Aichi-ken (JP)

( * ) Notice: Subject to any disclaimer, the term of this patent is extended or adjusted under 35 U.S.C. 154(b) by 1095 days.

(21) Appl. No.: 11/625,601

(22) Filed: Jan. 22, 2007

(65) Prior Publication Data

US 2007/0177234 A1 Aug. 2, 2007

(30) Foreign Application Priority Data

Jan. 27, 2006 (JP) ................. 2006-019824

(51) Int. Cl.
*H04N 1/04* (2006.01)
*H04N 1/46* (2006.01)

(52) U.S. Cl. ........ 358/475; 358/497; 358/406; 358/483; 358/482; 358/509; 358/514; 358/504

(58) Field of Classification Search .......... 358/475, 358/482, 483, 406, 474, 463, 461, 509, 504, 358/505, 514; 399/220; 250/205, 578.1, 250/234–236; 362/800, 611, 612, 613; 355/67–70
See application file for complete search history.

(56) References Cited

U.S. PATENT DOCUMENTS

| 6,456,748 | B1 | 9/2002 | Yushiya et al. | |
| 6,788,436 | B1 * | 9/2004 | Yoshida et al. | 358/475 |
| 7,349,133 | B2 | 3/2008 | Sugeta | |
| 7,642,495 | B2 * | 1/2010 | Ishikawa | 250/205 |
| 2005/0094215 | A1 * | 5/2005 | Nagasaka | 358/406 |
| 2008/0231917 | A1 * | 9/2008 | Tsukahara | 358/475 |
| 2010/0245942 | A1 * | 9/2010 | Shimatani | 358/475 |

FOREIGN PATENT DOCUMENTS

| JP | H03-285476 A | 12/1991 |
| JP | 4243367 A | 8/1992 |
| JP | 6003528 A | 1/1994 |
| JP | 7193675 A | 7/1995 |
| JP | H10-056577 A | 2/1998 |
| JP | 11046282 A | 2/1999 |
| JP | 11215302 A | 8/1999 |
| JP | 2001-127963 A | 5/2001 |
| JP | 2002320070 A | 10/2002 |
| JP | 2004-040669 A | 2/2004 |
| JP | 2004064406 A | 2/2004 |
| JP | 2007-129286 A | 5/2007 |

OTHER PUBLICATIONS

Japan Patent Office, Notification of Reasons of Rejection in Japanese Patent Application No. 2006-019824 (counterpart to the above-captioned U.S. Patent Application) mailed Apr. 28, 2009.

* cited by examiner

*Primary Examiner* — Cheukfan Lee
(74) *Attorney, Agent, or Firm* — Baker Botts L.L.P.

(57) ABSTRACT

There is provided an image reading device, which comprises an illumination unit configured to diffuse light from light sources in a predetermined scanning direction to illuminate an object with diffused light, a reading unit having photoreceptors aligned in the predetermined scanning direction to receive light reflected from the object, a detection unit configured to detect lighting status of the light sources; and a controller that obtains an image of the object by using a normal one of the light sources as a main light source if at least one of the light sources is in an abnormal state.

16 Claims, 12 Drawing Sheets

IMAGE READING DEVICE

CROSS-REFERENCE TO RELATED APPLICATION

This application claims priority under 35 U.S.C. §119 from Japanese Patent Application No. 2006-019824, filed on Jan. 27, 2006. The entire subject matter of the application is incorporated herein by reference.

BACKGROUND

1. Technical Field

Aspects of the present invention relate to an image reading device for reading an image from an original.

2. Related Art

A contact image sensor (CIS) is widely used as a reading device in a facsimile device, a copying device and the like. This type of contact image sensor is configured to execute a reading operation in accordance with a start signal and clock pulses from a control unit as disclosed in Japanese Patent Provisional Publications Nos. 2002-320070, HEI 7-193675, HEI 11-215302, and 2004-64406.

FIG. 7A is a conceptual illustration of a configuration of a contact image sensor unit. As shown in FIG. 7A, the contact image sensor unit includes a light guide 101 provided with light sources 103a and 103b such as an LED at its both ends, and an image sensor 107. The light guide 101 diffuses light from the light sources 103a and 103b in a main scanning direction, which is indicated by an arrow in FIG. 7A, to illuminate an original 105. The image sensor 107 is formed to be elongated in the main scanning direction and receives light reflected from the original 105. The model shown in FIG. 7A supports reading of an A4 size sheet that needs a relatively wide reading area, by providing two light sources at both ends of the light guide 101 to secure a sufficient amount of light for image reading.

FIG. 7B is an explanatory illustration for explaining a drawback that the image reading device shown in FIG. 7A may have. In FIG. 7B, output levels (hereafter, referred to as white levels) of the image sensor 107 obtained when a white object is illuminated are shown. More specifically, a graph C1 represents the white level obtained when the white object is illuminated only by the right side LED 103b, and a graph C2 represents the white level obtained when the white object is illuminated only by the left side LED 103a. As can be seen from graphs C1 and C2, when only one of the LEDs 103a and 103b is activated, the white level gradually decreases as a distance from the LED emitting light increases. Therefore, if one of the LEDs is in an abnormal state, an adequate amount of light for image reading can not be secured.

SUMMARY

Aspects of the present invention are advantageous in that an image reading device capable of properly reading an image from an original even if one of light source devices is in an abnormal state.

BRIEF DESCRIPTION OF THE ACCOMPANYING DRAWINGS

DETAILED DESCRIPTION

General Overview

Figure 1:
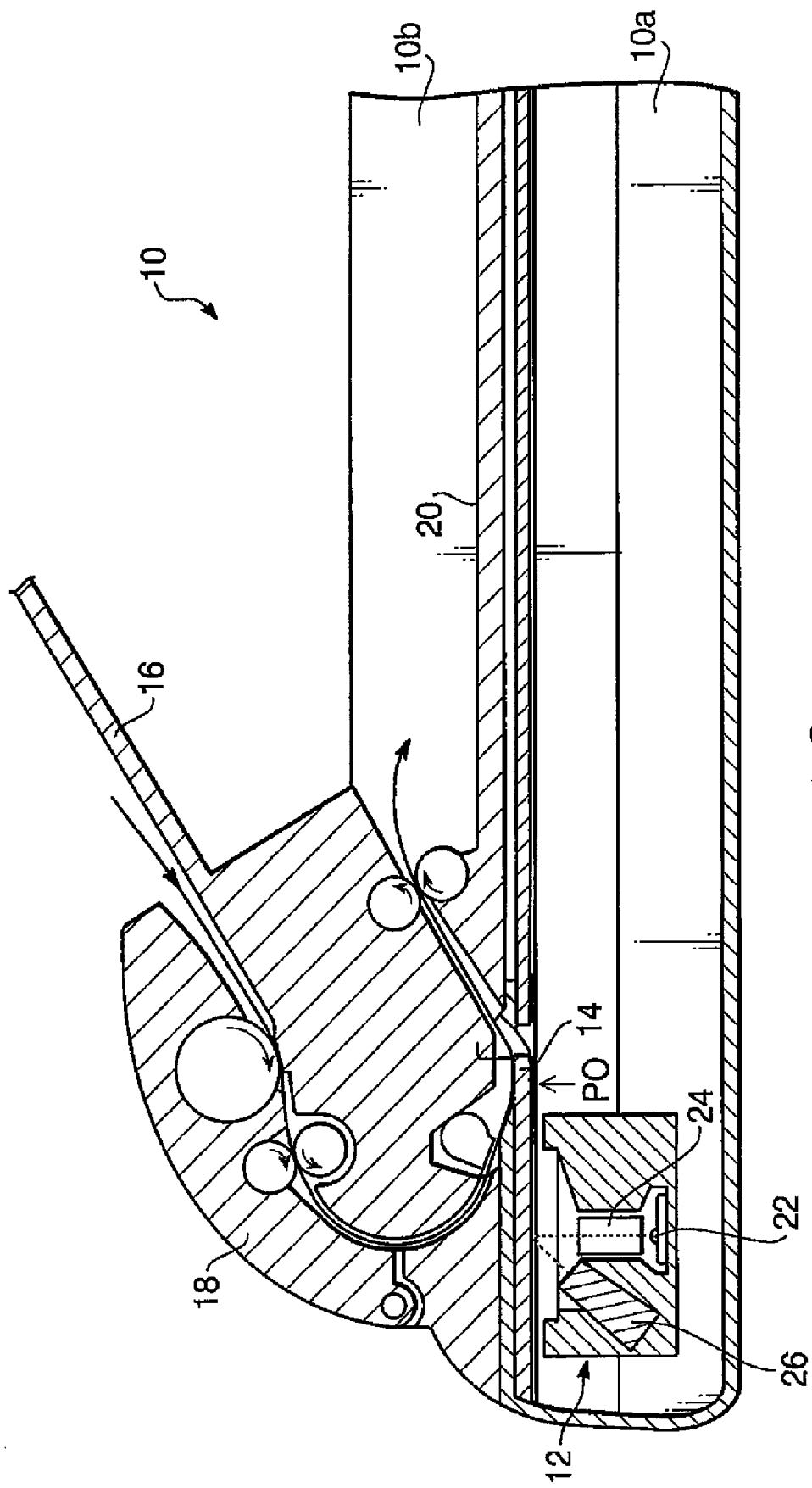
FIG. 1 is a side cross section of an image reading device according to an embodiment.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an image reading device, which comprises an illumination unit configured to diffuse light from light sources in a predetermined scanning direction to illuminate an object with diffused light, a reading unit having photoreceptors aligned in the predetermined scanning direction to receive light reflected from the object, a detection unit configured to detect lighting status of the light sources, and a controller that obtains an image of the object by using a normal one of the light sources as a main light source if at least one of the light sources is in an abnormal state.

By virtue of the above mentioned configuration, even if one light source is in an abnormal state, the image reading device is able to read an image of an object using the other light source in a normal state. Therefore, the light amount of the light source in a normal state can be effectively used.

The abnormal state of the light source includes a state that the light amount of the light source is lower than a predetermined amount as well as a state that the light source is not able to emit light.

In at least one aspect, the image reading device further comprises a detection unit configured to detect lighting status of the light sources. The controller is configured such that, in response to the abnormal state of the at least one light source of the light sources being detected by the detection unit, the controller controls the reading unit so that the reading unit obtains the image of the object on an opposite side with respect to the at least one light source in the abnormal state in the predetermined scanning direction.

In at least one aspect, the controller defines a reading region within which the reading unit obtains the image of the object with reference to a position on the opposite side of the at least one light source in the abnormal state.

In at least one aspect, the reading unit is configured such that the photoreceptors are divided into a plurality of blocks each of which includes more than one photoreceptor. In this case, the controller is able to control the plurality of blocks concurrently. Further, the controller operates not to provide a driving signal for one of the plurality of blocks corresponding to a side on which the at least one light source in the abnormal state lies in the predetermined direction.

Since the reading unit is controlled on a block-by-block basis, it is possible to execute the reading of the image quickly by control the reading unit not to provide the driving signal for the block on the side on which the light source in the abnormal state lies.

In at least one aspect, the image reading device further comprises a notification unit configured to notify a user to place the object on the opposite side of the at least one light source in the abnormal state.

With this configuration, it is possible to urge the user to place the object on the side where the light source in an normal state lies. Therefore, it is possible to effectively use the light amount of the light source in a normal state.

In at least one aspect, the controller turns off the at least one light source in the abnormal state.

In at least one aspect, the illumination unit includes a light guide which diffuses light from the light sources, and the light sources are provided at both ends of the light guide.

In at least one aspect, the illumination unit includes a light guide which diffuses light from the light sources, and the light sources are provided at one end of the light guide.

In at least one aspect, each of the light sources includes a plurality of light-emitting devices.

In at least one aspect, each of the plurality of light-emitting devices is a light-emitting diode.

In at least one aspect, the plurality of light-emitting devices of each light source are light-emitting diodes respectively corresponding to primary colors of light.

In at least one aspect, the controller uses all the light sources in a case where all the light sources are in a normal state.

According to another aspect of the invention, there is provided an image reading device, which comprises an illumination unit configured to diffuse light from light sources in a predetermined scanning direction to illuminate an object with diffused light, a reading unit having photoreceptors aligned in the predetermined scanning direction to receive light reflected from the object, a detection unit configured to detect lighting status of the light sources, and a controller configured such that, in response to the abnormal state of the at least one light source of the light sources being detected by the detection unit, the controller controls the reading unit so that the reading unit obtains the image of the object on an opposite side with respect to the at least one light source in the abnormal state in the predetermined scanning direction.

By virtue of the above mentioned configuration, even if one light source is in an abnormal state, the image reading device is able to read an image of an object using the other light source in a normal state. Therefore, the light amount of the light source in a normal state can be effectively used.

According to another aspect of the invention, there is provided an image reading device, which comprises an illumination unit configured to diffuse light from light sources in a predetermined scanning direction to illuminate an object with diffused light, a reading unit having photoreceptors aligned in the predetermined scanning direction to receive light reflected from the object, a detection unit configured to detect status of the reading unit, and a controller configured such that, in response to an abnormal state in at least a part of the reading unit being detected by the detection unit, the controller controls the reading unit so that the reading unit obtains an image of the object on an opposite side of the at least a part in the abnormal state in the predetermined scanning direction.

By virtue of the above mentioned configuration, even if a part of the reading unit is in an abnormal state, the image reading device is able to read an image of an object using the other part of the reading unit in a normal state. Therefore, the light amount of the light source located on the side where the other part of the reading unit in a normal state lies.

In at least one aspect, the reading unit has a plurality of reading blocks each of which has photoreceptors aligned in the predetermined scanning direction. In this case, the detection unit detects status of each block. Further, the controller is configured such that in response to an abnormal state of at least one block of the plurality of reading blocks being detected by the detection unit, the controller controls the reading unit so that the reading unit obtains an image of the object on an opposite side of the at least one block in the abnormal state.

In at least one aspect, the detection unit detects the at least a part of the reading unit is in the abnormal state by detecting a drop in output signals generated by the reading unit.

In at least one aspect, the image reading device further comprises a notification unit configured to notify a user to place the object on the opposite side of the at least a part in the abnormal state.

Embodiment

Hereafter, an embodiment according to the invention will be described with reference to the accompanying drawings.

FIG. 1 is a side cross section of an image reading device 10 according to an embodiment. The image reading device 10 has a flat bed mechanism as well as an ADF (Automatic Document Feeder). The image reading device 10 has a clam shell-like structure in which a cover 10b is attached to a flat bed 10a so as to be openable and closable with respect to the flat bed 10a.

In the flat bed 10a, various components including a CIS (Contact Image Sensor) 12 and a platen glass 14 are provided. In the cover 10b, various components including an original supply tray 16, an original feed unit 18, and an original output tray 20 are provided. In this embodiment, the image sensor 12 is formed of a MOS type image sensor. However, the image sensor 12 may be formed of a CCD type image sensor.

The image sensor 12 has a light guide 26 serving to illuminate an object (i.e., an original) placed at a reading position P0, and a lens (e.g., a SELFOC™ lens) 24 and a photoreceptor unit 22 having photoreceptors arranged in a line. The lens 24 converges light reflected from the original onto the photoreceptor unit 22 so that an image formed by the lens 24 can be read by the photoreceptor unit 22. The image sensor 12 is driven by a driving mechanism (not shown in FIG. 1) to be movable in a lateral direction in FIG. 1. When the original is read by the image reading device 1, the image sensor 12 is moved to the reading position P0 so that the photoreceptor unit 22 is situated beneath the original.

Figure 2A:
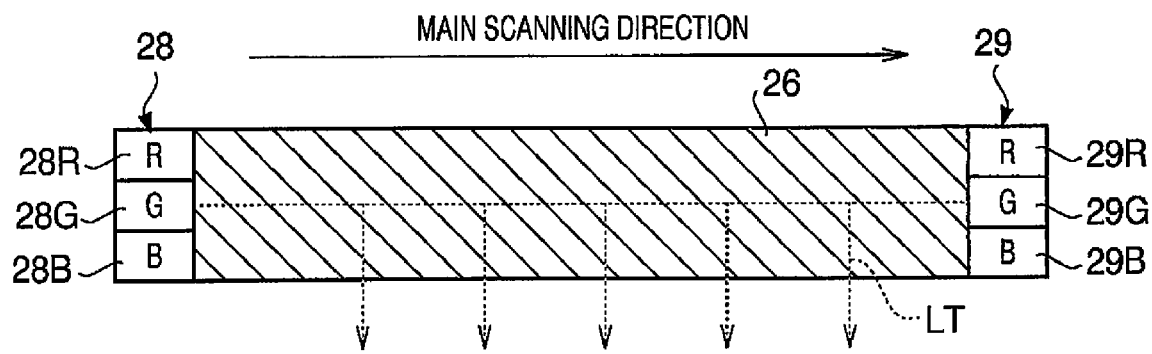
FIG. 2A illustrates a configuration of a light guide in the image reading device.
Figure 2B:
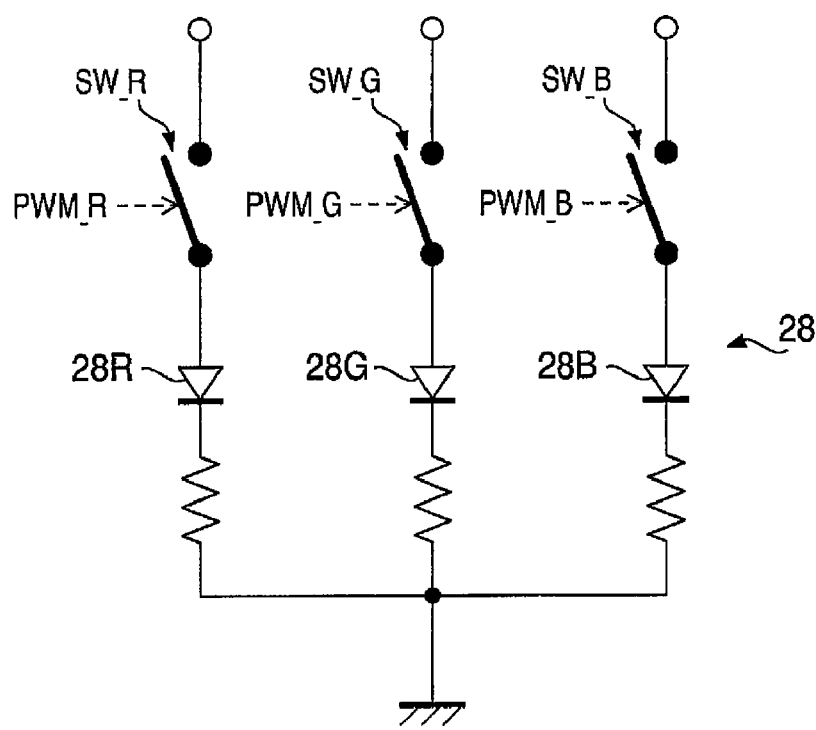
FIG. 2B is a circuit diagram for explaining control of LEDs serving as a light source in the image reading device.

FIG. 2A illustrates a configuration of the light guide 26. As shown in FIG. 2A, the light guide 26 has a form of a column elongated in a main scanning direction indicated by an arrow in FIG. 2A, and has light sources 28 and 29 formed of LEDs at its both ends. The light guide 26 diffuses light LT emitted by the light sources 28 and 29 in the main scanning direction to illuminate the original. The light source 28 includes LEDs 28R, 28G and 28B respectively corresponding to the primary colors of red, green and blue. As shown in FIG. 2B, the LEDs 28R, 28G and 28B are respectively connected to switching devices (e.g., FETs) SW_R, SW_G, and SW_B so that the LEDs 28R, 28G and 28B are separately turned on or off by an ASIC 105 (see FIG. 3) through control signals PWM_R, PWM_G and PWM_B. The light amount of each of the LEDs 28R, 28G and 28B can be controlled by adjusting a pulse width of each of the control signals PWM_R, PWM_G and PWM_B. The light source 29 has substantially the same structure as that of the light source 28.

Figure 3:
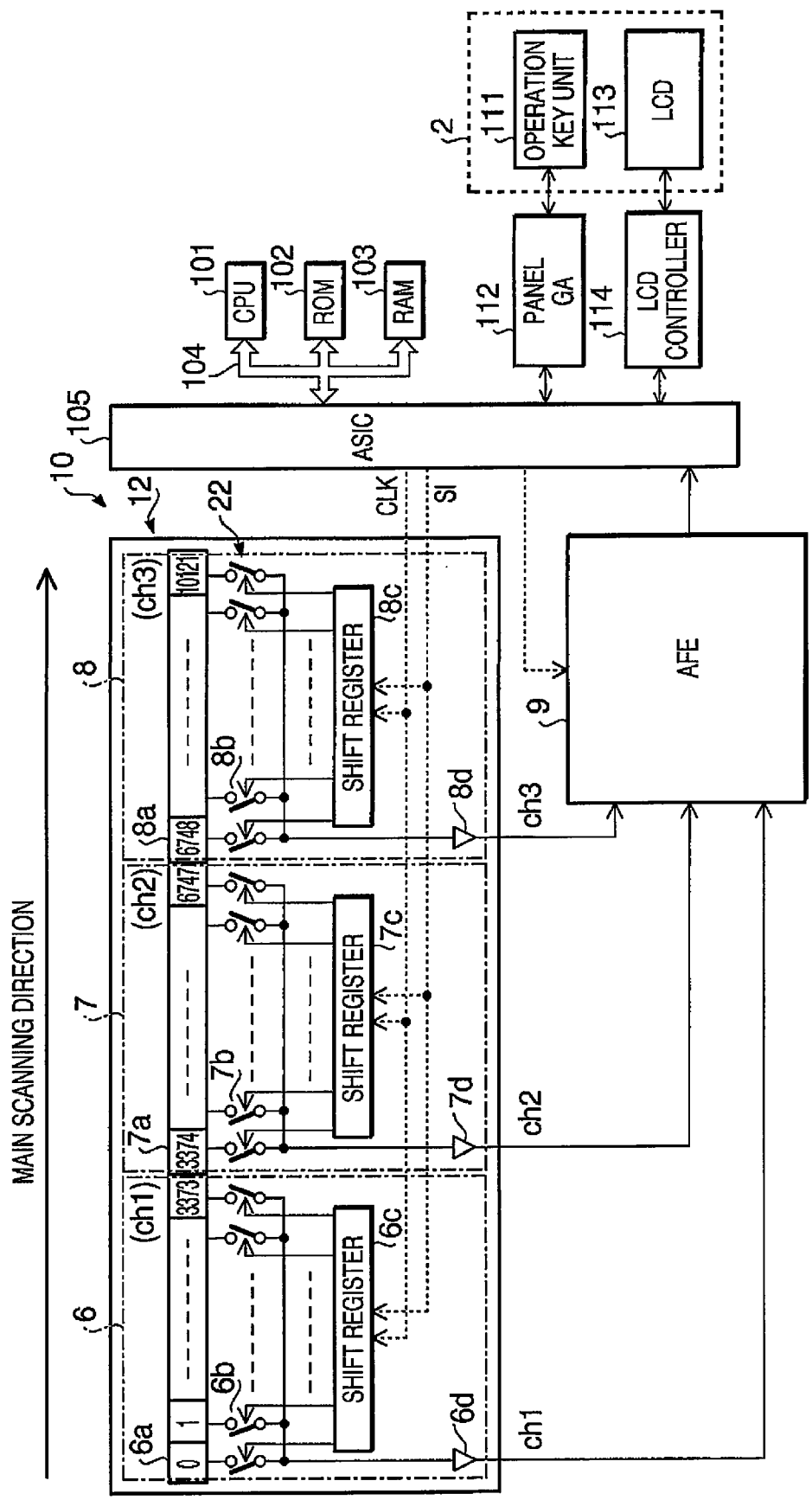
FIG. 3 illustrates a control system of the image reading device.

FIG. 3 illustrates a control system of the image reading device 10. As shown in FIG. 3, the image reading device 10 includes the image sensor 12, an analog front end (AFE) 9 serving to convert each of output signals respectively corresponding to pixels (photoreceptors) on the image sensor 12 into image data (i.e., digital data), and the ASIC (Application Specific Integration Circuit) 105 configured to execute various types of processing on the image data from the AFE 9 and to control the image sensor 12 and the AFE 9.

To the ASIC 105, a CPU 101 controlling functions of the image reading device 10, a ROM 102 storing programs to be executed by the CPU 101 and data used for the programs, and a RAM 103 which is used as a work memory for the CPU 101 and is used to temporarily store the image data processed in the ASIC 105 are connected via a bus 104.

An operation key unit 111 and an LCD (Liquid Crystal Display) 113 are also connected to the ASIC 105 via a panel GA (gate array) 112 and an LCD controller 114, respectively. The panel GA 112 is configured to detect pressing of a key on the operation key unit 111 and to output a code signal representing the pressed key. The LCD controller 114 controls the LCD 113 to display an image on the LCD 113.

The photoreceptor unit 22 includes three reading blocks 6, 7 and 8 respectively corresponding to photoreceptor channels ch1, ch2 and ch3. In the image reading device 10, an image is read by the image sensor 12, and output signals from the photoreceptor channels ch1, ch2 and ch3 are inputted to the AFE 9. That is, the image sensor 12 is divided into a plurality of channels (i.e., a plurality of regions), and output signals are outputted from each of the regions.

Each of the reading blocks 6, 7 and 8 has a number of photoreceptors. That is, the reading blocks 6, 7 and 8 respectively have line sensors 6a, 7a and 8a each of which is arranged linearly in the main scanning direction.

The image sensor 12 starts to operate when receiving a start signal SI from the ASIC 105, and each of the reading blocks 6, 7 and 8 outputs signals of the photoreceptors in order where the photoreceptors are arranged in the main scanning direction.

Hereafter, the operation of each of the reading blocks 6, 7 and 8 is described. The reading block 6 is configured to be capable of executing a reading operation in 1200 dpi for an A4 sheet. Specifically, the reading block 6 includes the line sensor 6a having 3374 (#0 to #3373) photoreceptors arranged linearly in the main scanning direction, switches 6b each of which is located between a buffer amplifier 6d and each photoreceptor, and a shift register 6c configured to turn on the switches 6b sequentially in the main scanning direction. Each switch 6b is formed of, for example, a semiconductor switching device such as a MOS transistor.

To the shift register 6c, the start signal SI and a reading reference clock CLK are inputted. The shift register 6c operates to turn on the switches 6b sequentially in the main scanning direction in accordance with the clock CLK. Specifically, when the switch 6b corresponding to a first photoreceptor (#0) is turned on, the output signal of the first photoreceptor is inputted to the AFE 9 via the buffer amplifier 6d. Next, by turning on the switch 6b corresponding to a second photoreceptor (#1), the output signal of the second photoreceptor is inputted to the AFE 9 via the buffer amplifier 6d. Such a switching operation is repeated until the switch 6b corresponding to the last photoreceptor (#3373) is turned on.

Similarly to the reading block 6, the reading block 7 includes the line sensor 7a having 3374 (#3374 to #6747) photoreceptors arranged linearly in the main scanning direction, switches 7b each of which is located between a buffer amplifier 7d and each photoreceptor, and a shift register 7c configured to turn on the switches 7b sequentially in the main scanning direction. Similarly to the reading block 6, the reading block 8 includes the line sensor 8a having 3374 (#6748 to #10121) photoreceptors arranged linearly in the main scanning direction, switches 8b each of which is located between a buffer amplifier 8d and each photoreceptor, and a shift register 8c configured to turn on the switches 8b sequentially in the main scanning direction.

Each of the switches 6b and 7b is formed of, for example, a semiconductor switching device such as a MOS transistor. Since the reading blocks 7 and 8 have substantially the same functions as that of the reading block 6, the explanations thereof will not be repeated. The ASIC 105 drives the reading blocks 6, 7 and 8 concurrently under control of the CPU 101.

The AFE 9 includes three offset adjustment circuits respectively corresponding to the three channels ch1, ch2 and ch3, and three amplifiers to which the offset adjustment circuits are connected, respectively. The AFE 9 further includes a multiplexer (MUX) outputting sequentially output signals of one of the amplifiers, and an A-D converter configured to convert the analog signal from the MUX to image data (i.e., digital data). The converted image data is then inputted to the ASIC 105.

The ASIC 105 has a function of controlling the image sensor 12 and the AFE 9 in accordance with predetermined timing signals, a function of reading image data from or writing image data to the RAM 103, and a function of executing various types of processing on the image data.

Figure 4:
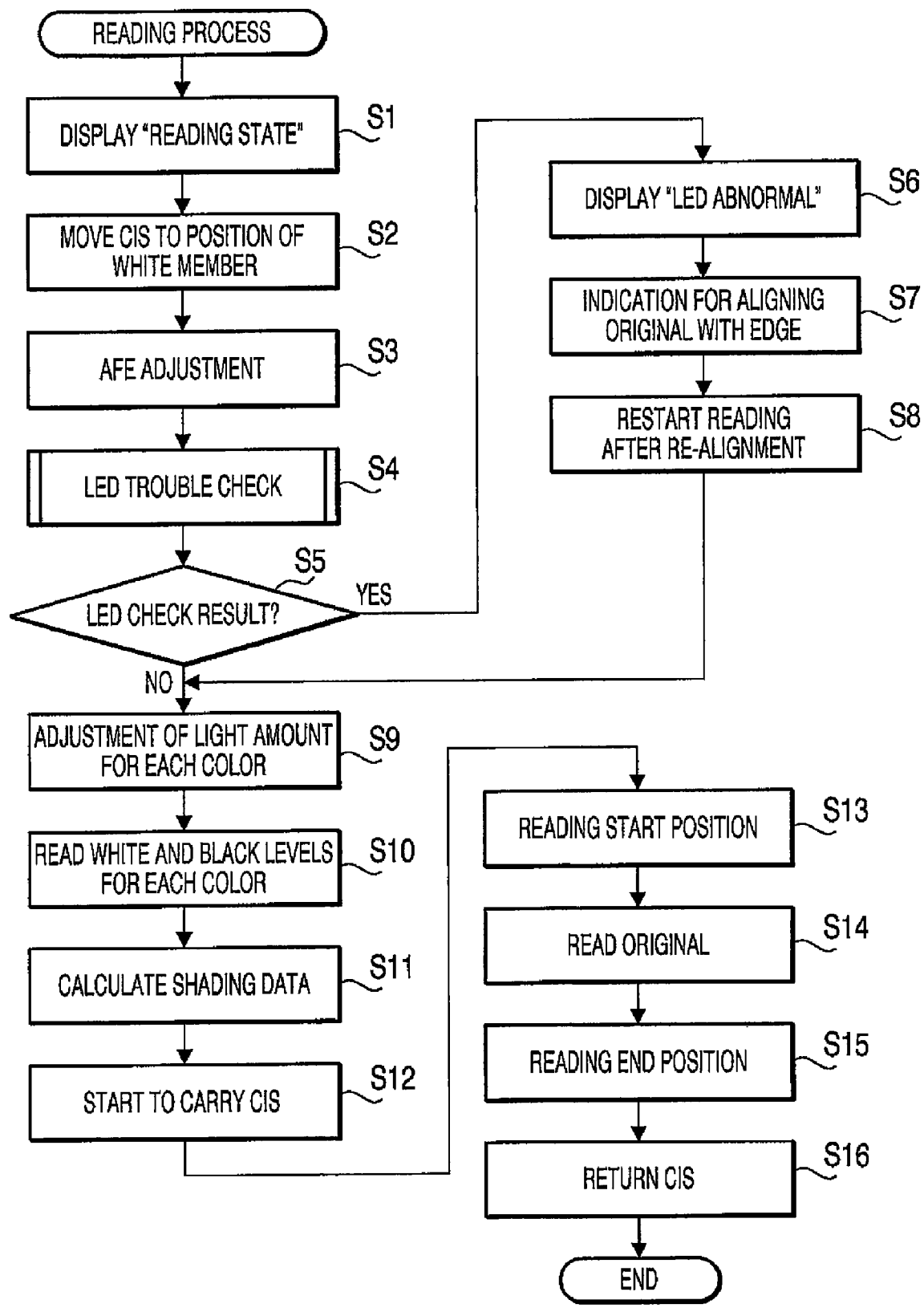
FIG. 4 is a flowchart illustrating a reading process executed by the image reading device to read an image from an original.

FIG. 4 is a flowchart illustrating a reading process executed under control of the CPU 101 of the image reading device 10 to read an image from an original. First, the CPU 101 displays a message indicating that the image reading device 10 is in a reading state on the LCD 113 (step S1). Then, the CPU 101 controls the driving mechanism to move the image sensor 12 to a position beneath a white member provided on a lower surface of a top wall of the flat bed 10a to detect a white level (step S2). The white member is formed to be elongated in the main scanning direction near the reading position P0. Next, the CPU 101 adjusts the AFE 9 (step S3). In step S3, offset values and gains are set to the offset adjustment circuits and analog amplifiers in the AFE 9.

Then, the CPU 101 judges whether the light sources 28 and 29 provided at both ends of the light guide 26 produce trouble (i.e., whether the light sources 28 and 29 are in abnormal states) (step S4). That is, the CPU 101 executes a LED trouble check process in step S4.

Figure 5:
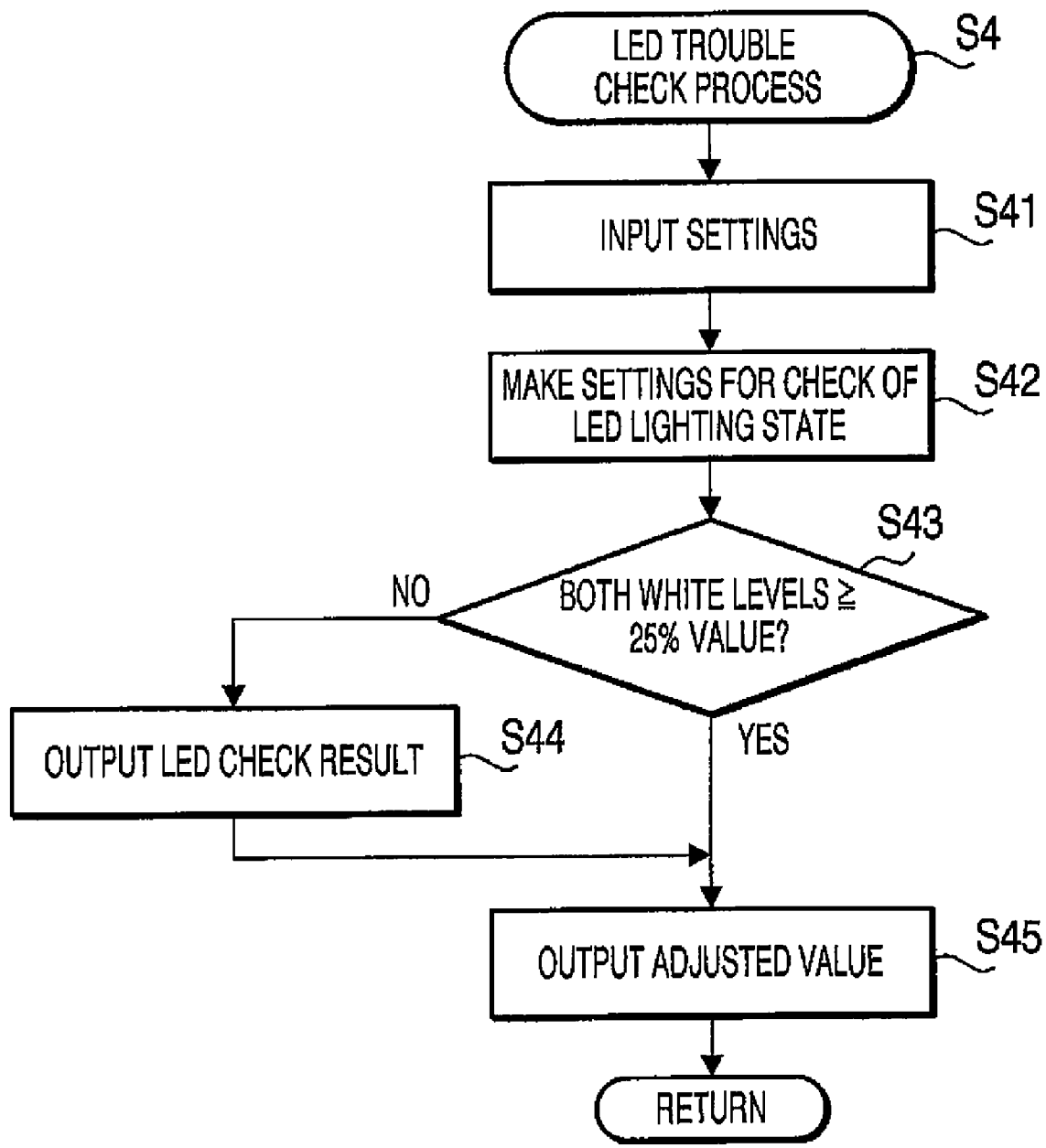
FIG. 5 is a flowchart illustrating an LED trouble check process executed under control of the image reading device.

FIG. 5 is a flowchart illustrating the LED trouble check process executed under control of the CPU 101 of the image reading device 10. In the LED trouble check process, all of the LEDs 28R, 28G and 28B in the light source 28 and the LEDs 29R, 29G and 29B in the light source 29 are checked. First, the CPU 101 sets initial offset values and gains (step S41). Then, the CPU 101 makes settings for checking lighting states of the light sources (the LEDs 28R, 28G, 28B and LEDs 29R, 29G and 29B). In order to check the lighting state based on the amount of light emitted by each of the LEDs 28R, 28G, 28B and LEDs 29R, 290 and 29B, each of pulse widths of the control signals PM_R, PWM_G, and PWM_B is set to its maximum value in step S42.

If a white level (which is a level of an output signal of the image sensor 12 when the white object is illuminated) is lower than or equal to a predetermined value (e.g., a 25% of a typical white level), the CPU 101 judges that the light source is in an abnormal state. If the white level is larger than the predetermined value, the CPU 101 judges that the light source is in a normal state (step S43). That is, the predetermined value corresponds to a threshold level of the received light amount for judging whether a light source is in such a dark level that an image can not be read appropriately.

In step S42, the predetermined value is set to a value equal to the upper limit (RefH) of a voltage range within which the analog amplifier in the AFE 9 is able to perform amplification. If the predetermined value is approximately 25% of the typical white level, the gain of the analog amplifier is set to 4 times a typical gain of the analog amplifier so that if the white level of the image sensor 12 exceeds the predetermined value, the voltage of the output signal from the image sensor 12 exceeds the upper limit Ref1. That is, whether the light source is in a normal state is judged by judging whether a pixel (an overflow pixel) of which level of the output signal exceeds the upper limit RefH exists.

By thus conducting the checking of the light source, it is possible to use the image sensor 12 as a detection unit for checking the lighting state of the light source. However, as another example, a dedicated detection unit for checking the lighting state of the light source may be provided in the image reading device 10. The lighting state may be analyzed by measuring a current flowing through each LED.

If one of the LEDs 28R, 28G, 28B and LEDs 29R, 29G and 29B is judged to be in an abnormal state (i.e., the CPU 101 judges that the white level is lower than 25% of the typical white level) (S43: NO), the CPU 101 temporarily stores information representing the light source in an abnormal state (hereafter, referred to as an LED check result) in the RAM 103 (step S44). Then, the CPU 101 outputs the LED check result (step S45). Then, control returns to the reading process. The CPU 101 may controls the abnormal light source not to emit light by preventing the control signal corresponding to the abnormal light source from being supplied to the abnormal light source.

Figure 6:
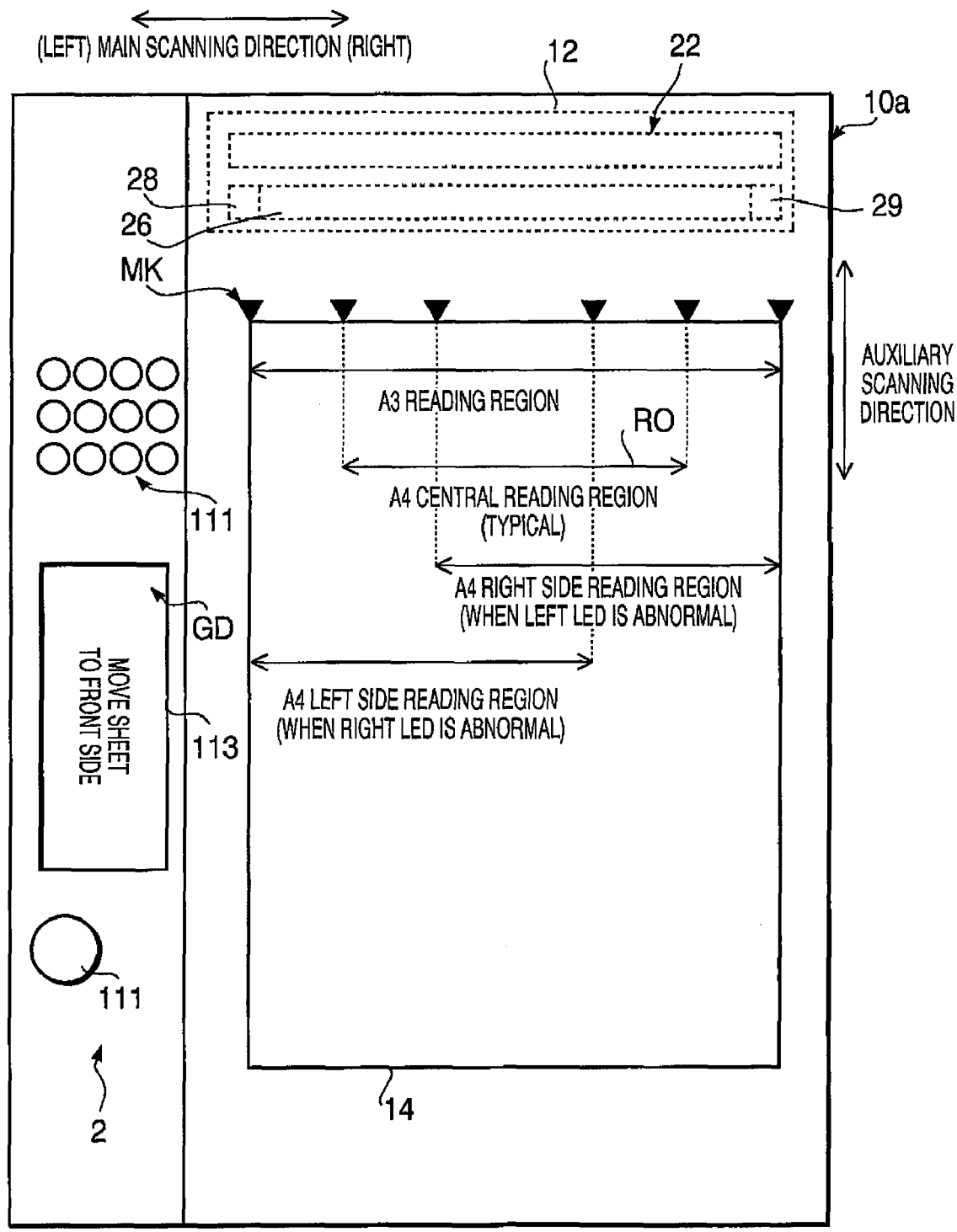
FIG. 6 is an explanatory explanation for explaining reading regions to be applied depending on a state of an image sensor.
Figure 7A:
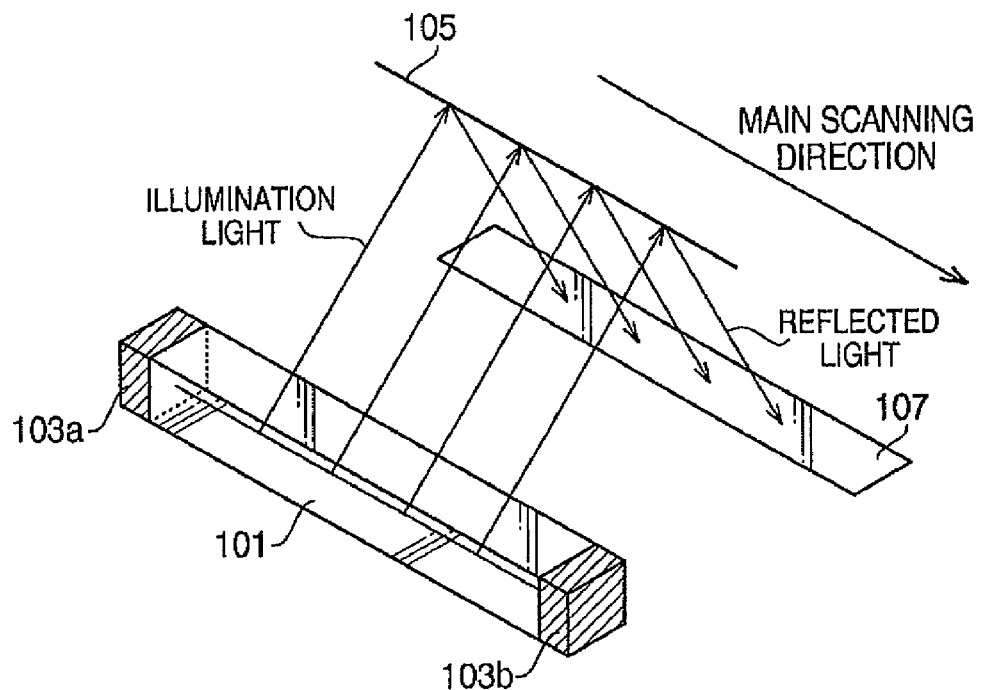
FIG. 7A is a conceptual illustration of a configuration of a contact image sensor unit.
Figure 7B:
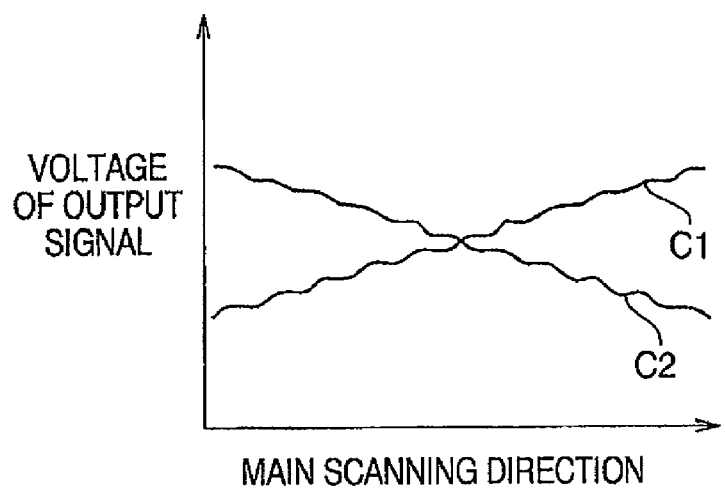
FIG. 7B is an explanatory illustration for explaining a drawback of the image reading device shown in FIG. 7.

Referring back to FIG. 4, if the LED check result exists (step S5: YES), the CPU 101 displays information indicating that the light source is in an abnormal state on the LCD 113 (step S6). Then, the CPU 101 displays a message GD requesting a user to move the original to a side on which normal one of the light sources is located as shown in FIG. 6 (step S7). FIG. 6 is a top view of the flat bed 10a of the image reading device 10. As shown in FIG. 6, the image sensor 12 is the type capable of reading an A3 size original. The image sensor 12 has the size substantially equal to the shorter side of an A3 size sheet in the main scanning direction. In a normal state, the image sensor 12 is at a recessed position with respect to the position of the platen glass 14. To read an image from the original, the image sensor 12 is moved in an auxiliary scanning direction which is substantially perpendicular to the main scanning direction.

In a normal state of the light sources, to read an image from a sheet having a size (e.g., A4 size) smaller than the width (i.e., an effective reading size) of the image sensor 12 in the main scanning direction, a central region of the image sensor 12 in the main scanning direction is used as a reading region (see a region R0 in FIG. 6). On the other hand, if the light source 29 is in an abnormal state, a message requesting the user to move the original to a side on which the light source 28 in a normal state lies (i.e., the front side) is displayed on the LCD 113.

Depending on the position of abnormal one of the light sources, the message requesting the user to move the original to the front side or the rear side is displayed on the LCD 113 because the light sources 28 and 29 are located at the both ends of the light guide 26 in the main scanning direction. An example of the message GD is, for example, words "Please place an original smaller than or equal to A4 at the front side". An illustration representing a recommended position of the original on the platen glass 14 may be displayed on the LCD 113 in place of the message GD. A message "One of the light sources is not on. Please call service person immediately" may be displayed on the LCD 113 in place of the message GD.

On the side where the image sensor 12 is at its recessed position, original position guide marks MK are formed to indicate positions at which an edge of an original is to be placed. For example, if the original is to be moved to the front side (i.e., the light source 28 side), it is preferable to move the original to the front side edge of the platen glass 14. Therefore, the original position guide marks MK are located at positions where the edges of the original lie when the original is moved at the light source 28 side edge of the platen glass 14. The original position guide marks MK for guiding the positions where the edges of the original lie when the original is moved to at the light source 29 side edge of the platen glass 14 are also formed on the platen glass 14.

By requesting the user to move the original toward the normal one of the light sources when one of the light sources 28 and 92 is in an abnormal state, it is possible to read an image from the original using effectively the light source in a normal state. It should be noted that such a configuration of the image reading device 10 is advantageous particularly in the case where an original having a size smaller than the width of the image sensor 12 in the main scanning direction is to be read.

By thus displaying the message GD (step S7), the CPU 101 urges the user to place the original appropriately. When the user operates a scan key 111 for executing the reading operation after placing appropriately the original, the CPU 101 detects the pressing of the scan key 111 (step S8) and moves to a sequence of reading steps.

If the LED check result does not exist (S5: NO) or the pressing of the scan key 111 is detected in step S8, the CPU 101 conducts adjustment of the light amount for each color (step S9). Then, the CPU 101 reads the white and black levels for each color (step S10), and calculates shading data for each color (step S11). The black level is an level of the output signal when the light sources 28 and 29 are off.

Next, the CPU 101 controls the driving mechanism (step S12) and moves the image sensor 12 to a read start position (step S13). Then, the CPU 101 reads an image from the original (step S14). After the image sensor 12 is moved to a reading end position and the reading is finished (step S15), the CPU 101 controls the driving mechanism to move the image sensor 12 to an original position (step S16). The reading process is thus finished.

If it is judged in step S14 that the LED check result exists, the CPU 101 may operate not to provide the start signal SI and the reading reference clock CLK for the reading block (6, 7, or 8) located on the side of the light source in an abnormal state.

Although the present invention has been described in considerable detail with reference to certain preferred embodiments thereof, other embodiments are possible. For example, the image reading device 10 may be configured such that the size of an original to be read can be set to the image reading device 10 via operation keys provided on the operation panel 2 and that the image reading device 10 notifies the user of a request for requesting the user to move the original to the side on which normal one of the light sources lies only if the size of the original is smaller than the width (the effective reading size) of the image sensor 12 in the main scanning direction.

Hereafter, a first variation of the above mentioned embodiment is described. Since a configuration of an image reading device according to the first variation is substantially the same as that shown in FIGS. 1 to 3, the first variation is explained with reference to these drawings, and only the feature of the first variation is explained. In the first variation, to elements which are substantially the same as those of the embodiment, the same reference numbers are assigned and explanations thereof will not be repeated.

In the first variation, the light guide 26 serves to diffuse light from the light sources 28 and 29 provided at both ends of the light guide 26 in the main scanning direction to illuminate the object. The image sensor 12 has the plurality of reading blocks 6, 7 and 8 which are aligned in the main scanning direction and receive light reflected from the object. The ASIC 105 functions as a notification unit which notifies a user to operate the image reading device to read an image using a normal part of the reading blocks if one of the reading blocks 6, 7 and 8 having trouble in generating output signals. With this configuration, even if one of the reading blocks 6, 7 and 8 is in an abnormal state, an image can be read from the original by effectively using the remaining, normal ones of the reading blocks 6, 7 and 8.

Figure 8:
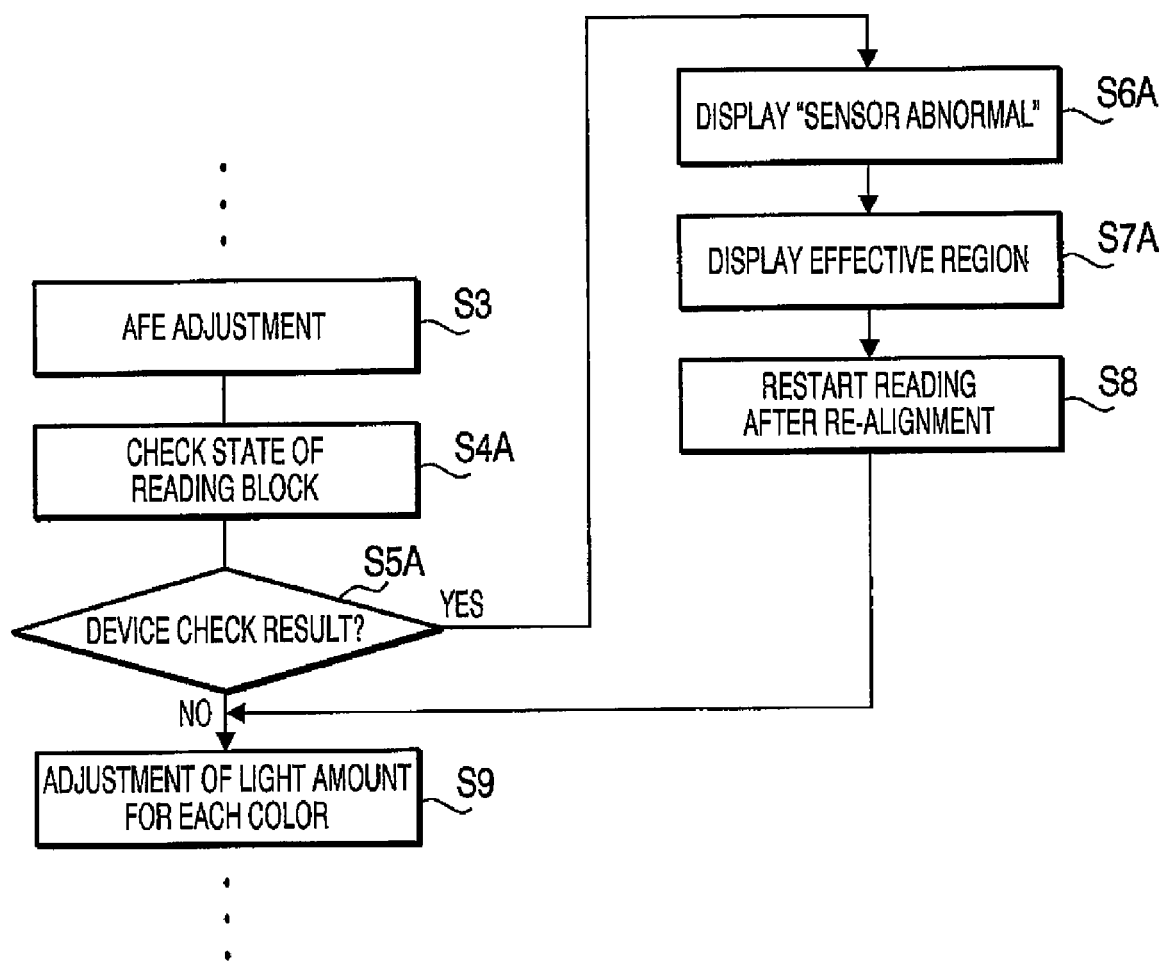
FIG. 8 is a part of a reading process executed by an image reading device according to a first variation of the embodiment.

FIG. 8 shows the reading process to be executed by the image reading device 10 according to the first variation. In FIG. 8, only the feature of the reading process according to the first variation is illustrated. After execution of the AFE adjustment (step S3), the CPU 101 checks whether the reading blocks 6, 7, and 8 are in abnormal states (step S4A). In step S4A, the CPU 101 is able to check whether the reading blocks 6, 7 and 8 are in abnormal states by turning on the light sources 28 and 29 to illuminate the white object and then judging whether the output signals are outputted from the reading blocks 6, 7 and 8. If the reading block outputs the output signals, the CPU 101 judges the reading block to be in a normal state. If the reading block does not output the output signals, the CPU 101 judges the reading block to be in an abnormal state. The CPU 101 stores a device check result indicating which of the reading blocks is in an abnormal state. Then, control proceeds to step S5A.

Figure 9:
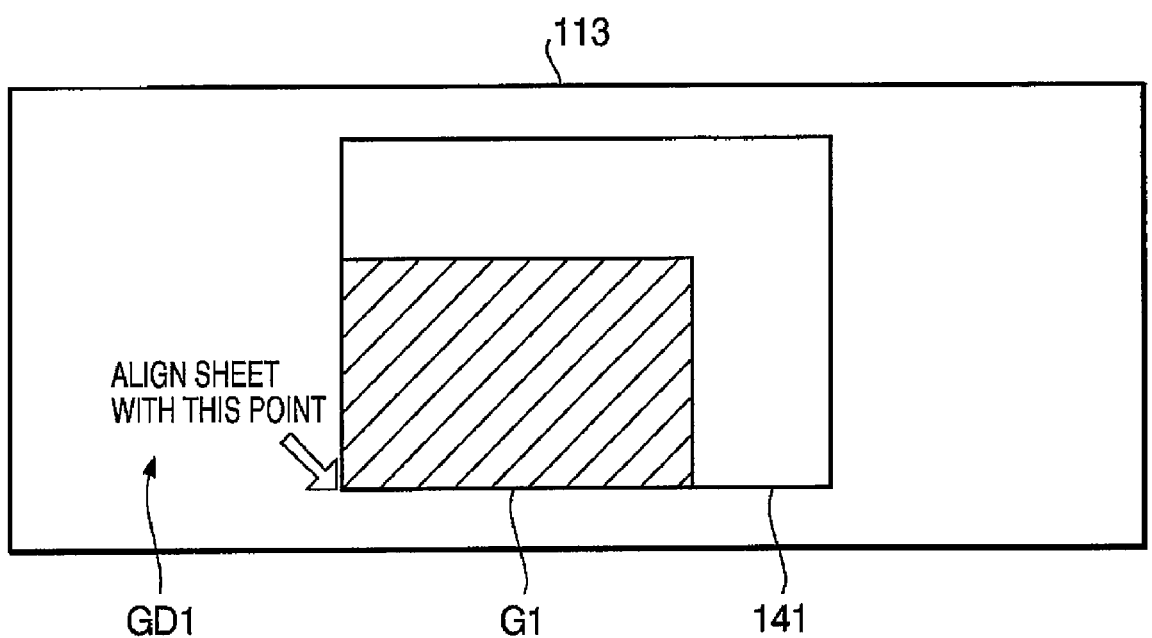
FIG. 9 illustrates an example of a screen displayed on a LCD of the image reading device according to the first example to represent a region within which reading of an image can be performed properly.

In step S5A, the CPU 101 judges whether the device check result exists. If the device check result exists (S5A: YES), the CPU 101 displays a notification indicating that the image sensor 12 is in an abnormal state on the LCD 113 (step S6A). Then, the CPU 101 displays a screen shown in FIG. 9 on the LCD 113 so that the image of the original is read by normal ones of the reading blocks 6, 7 and 8 not producing trouble (step S7A). In step S7A, the CPU 101 obtains a region within which the reading of the image can be conducted properly and displays such a region on the LCD 113. In the screen shown in FIG. 9, an image 141 corresponds to the platen glass 14, an image G1 represents the region within which the reading of the image can be conducted properly, and an image GD1 represents a guide message for showing a point with which the original is to be aligned. The example of the screen shown in FIG. 9 represents a situation where the reading block on the rear side with respect to the LCD 114 (i.e., the reading block 8) is in an abnormal state.

In step S7A, the CPU 101 obtains a region, within which the reading of the image can be conducted properly, in accordance with the positions of abnormal ones of the reading blocks 6, 7 and 8. For example, in the configuration of the reading blocks 6, 7 and 8 shown in FIG. 3, if the reading block (6 or 8) located on one side of the photoreceptor unit 22 is in an abnormal state, a region covered in the auxiliary direction by the remaining reading blocks (7 and 8 or 7 and 6) located on the other side of the photoreceptor unit 22 is used as an effective region. If the central reading block 7 is in an abnormal state, the reading of the image may be inhibited.

Figure 10:
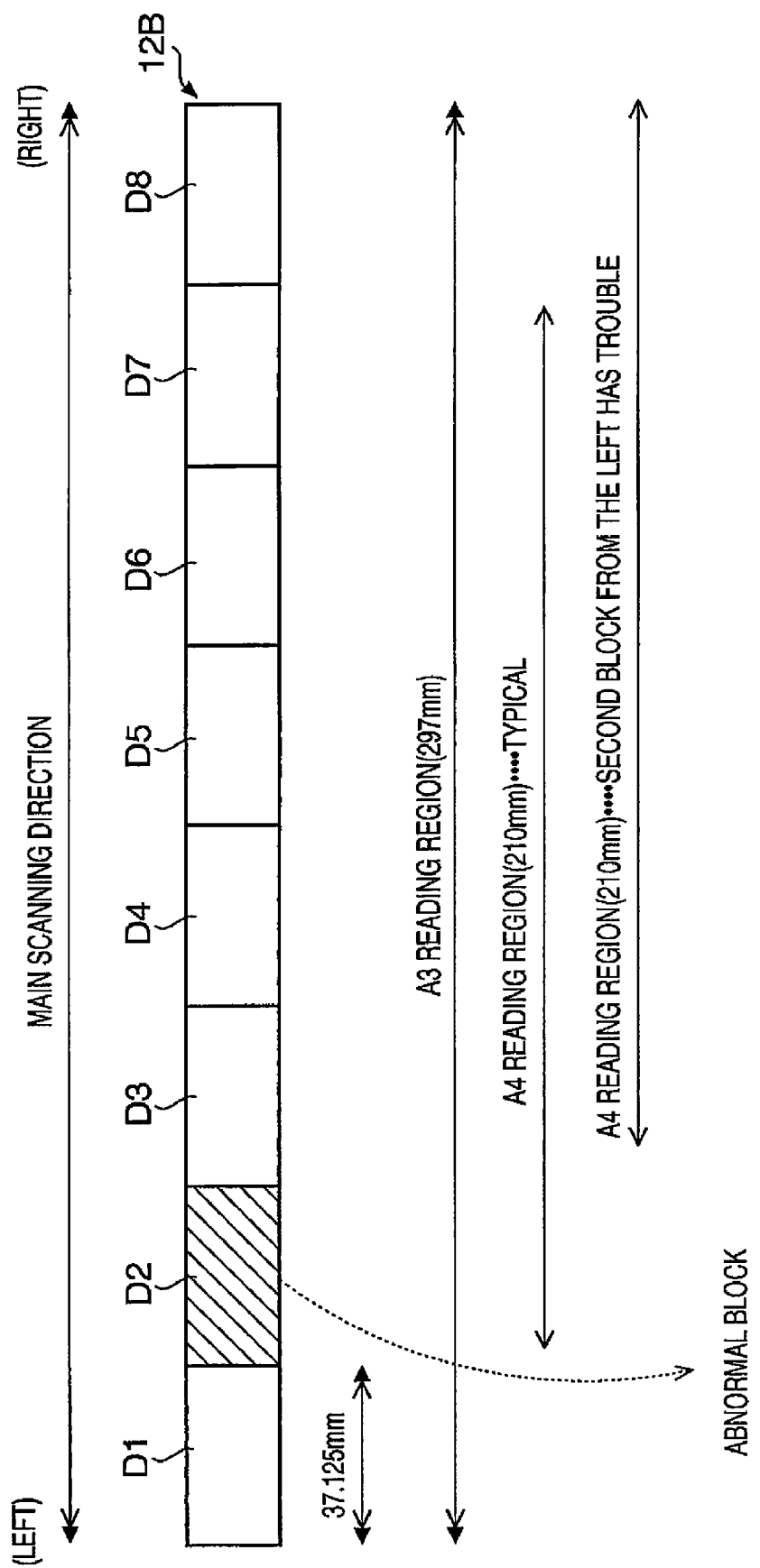
FIG. 10 illustrates an example of a configuration of the image sensor having more than three reading units.

The advantages of the above mentioned first variation can be achieved if the image sensor 12 has more than three reading blocks. FIG. 10 is a conceptual illustration of an image sensor 12B having eight reading blocks. The image sensor 12B is the type of being able to read an A3 size sheet. In this configuration, even if two reading blocks (D1 and D2 or D7 and D8) counted from one of ends of the image sensor 12B are in abnormal I states, the image sensor 12B still has at least six reading blocks on the other side to properly read a sheet having a certain size (e.g., A4 size). In this case, a region within which the remaining six normal reading blocks lie is defined as an effective region.

Hereafter, a second variation of the above mentioned embodiment is described. Since a configuration of an image reading device according to the second variation is substantially the same as that shown in FIGS. 1 to 3, the second variation is explained with reference to these drawings, and only the feature of the second variation is explained. In the second variation, to elements which are substantially the same as those of the embodiment, the same reference numbers are assigned and explanations thereof will not be repeated.

In the second variation, the light guide 26 serves to diffuses light from the light sources 28 and 29 provided at both ends of the light guide 26 in the main scanning direction to illuminate the object. The image sensor 12 is formed to extend in the main scanning direction and receives light reflected from the object. The ASIC 105 functions as a detection unit which detects whether the image sensor 12 is in an abnormal state in accordance with the output signals outputted by the image sensor 12 when the white objected is illuminated by the light guide 26, and as a notification unit which notifies a user to operate the image reading device to read an image using a normal part of the reading blocks not having trouble if one of the reading blocks 6, 7 and 8 has trouble in generating output signals.

With this configuration, even if the image sensor 12 has abnormal parts not generating output signals properly, for example, by adhesion of debris to the parts, an image can be read from the original by effectively using the other parts of the image sensor 12 not having the trouble.

Figure 11:
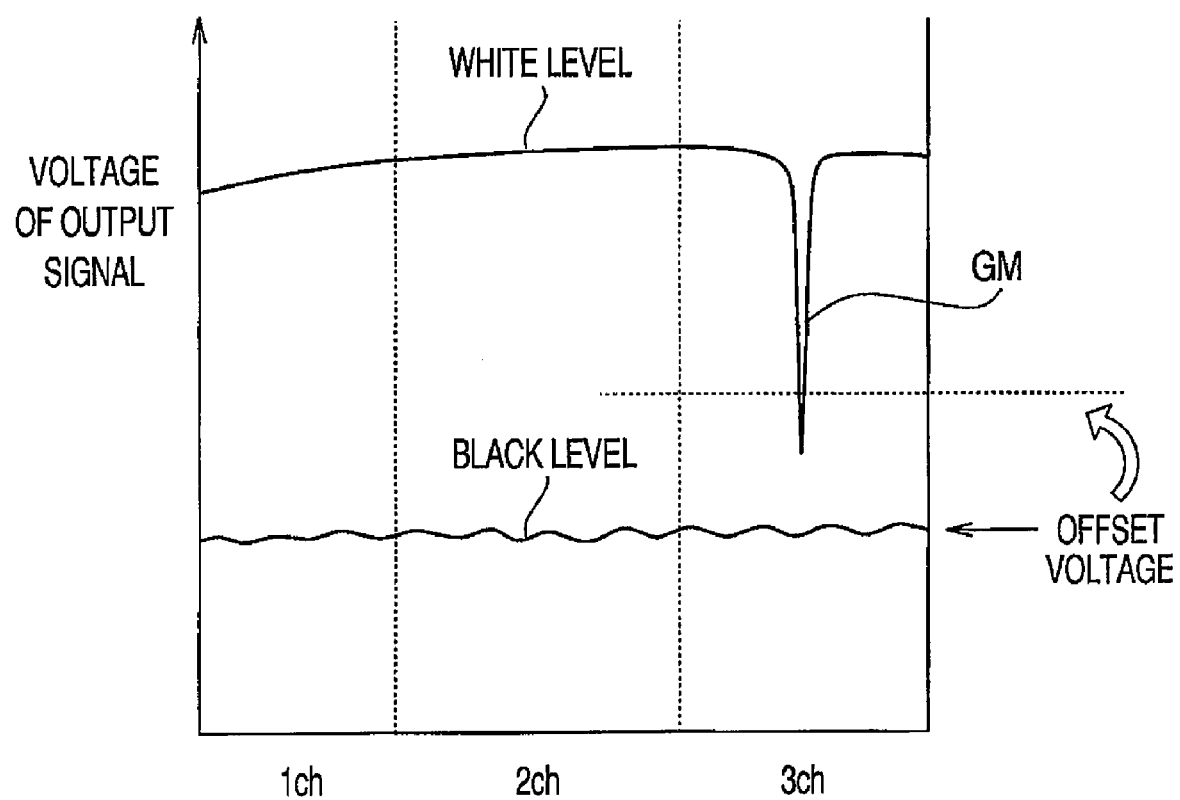
FIG. 11 is an example of a graph representing white levels and having a drop.

The image reading device 10 according to the second variation executes the reading process which is substantial the same as that shown in FIG. 8 excepting for step S4A. In step S4A according to the second variation, the image reading device 10 checks the white levels, i.e., the output signals of the image sensor 12 obtained when the white object is illuminated. The CPU 101 judges that the image sensor 12 is in an abnormal reception state when the white levels has a portion where levels are drop considerably. FIG. 11 is an example of a graph representing the white levels. In the example shown in FIG. 11, the graph has a drop GM. If the white levels have such a drop GM, the CPU 101 judges that the image sensor 12 is in an abnormal reception state.

The image reading device 10 is able to detect the drop GM by assigning an offset voltage higher than a typical offset voltage to the offset adjustment circuit of the AFE 9 and detecting whether a pixel (an underflow pixel) producing an output signal lower than the offset voltage exists.

If the image sensor 12 is judged to be in an abnormal reception state, the CPU 101 temporarily stores a device check result indicating which of the reading blocks 6, 7 and 8 is in an abnormal state in the RAM 103. Then, control proceeds to the above mentioned step S5A to obtain the effective region within which the reading of the image can be conducted properly.

In the second variation, the image reading device 10 operates not to use the entire part of the abnormal one of the reading blocks 6, 7 and 8. However, the image reading device 10 may be configured not use only a part corresponding to the drop GM of the abnormal reading block so that the reading of the image can be conducted by using the remaining part (i.e., the normal part) of the reading block judged to be in an abnormal state.

Figure 12:
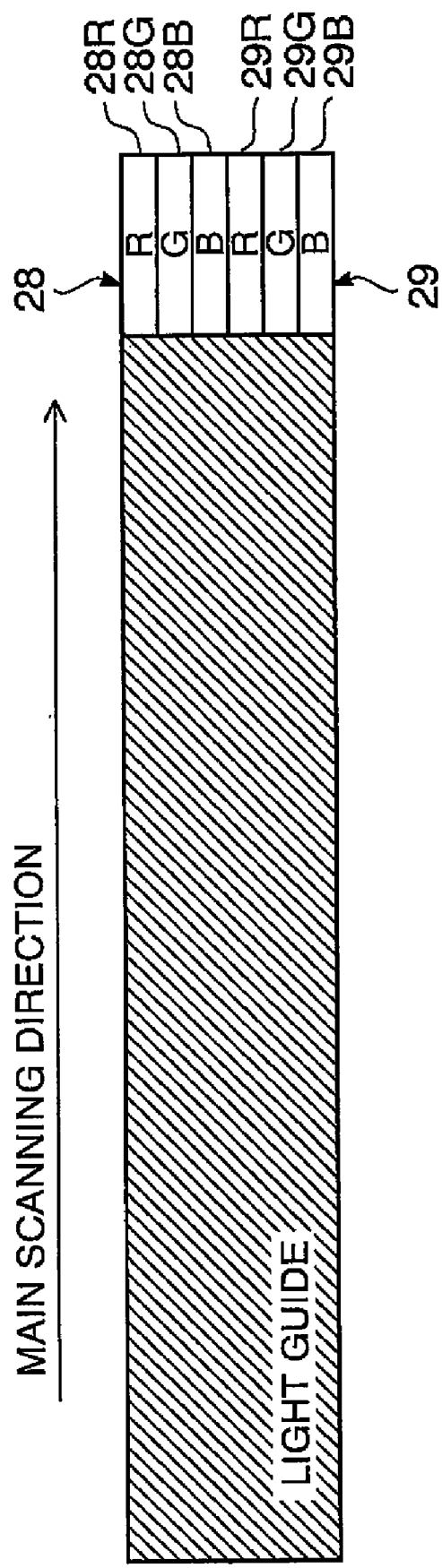
FIG. 12 is a variation of the light guide having light sources at its one end.

In the above mentioned configuration, the light guide 26 is provided with two light sources 28 and 29 at its both ends. However, the light sources 28 and 29 may be provided at one end of the light guide (see FIG. 12), and such a variation of the light guide 26 may be used in the above mentioned embodiment in place of the light guide 26.

In the above mentioned embodiment, right and left light sources 28 and 29 (i.e., all the light sources) are used to read an image in a normal state of the image reading device 10. However, one or more auxiliary light sources may be provided for the light guide 26.

What is claimed is:

1. An image reading device, comprising:
an illumination unit configured to diffuse light from light sources in a predetermined scanning direction to illuminate an object with diffused light;
a reading unit having photoreceptors aligned in the predetermined scanning direction to receive light reflected from the object; and
a controller that obtains an image of the object by using a normal one of the light sources as a main light source if at least one of the light sources is in an abnormal state,
wherein the controller defines a reading region within which the reading unit obtains the image of the object with reference to a position on the opposite side of the at least one light source in the abnormal state.

2. The image reading device according to claim 1, further comprising a detection unit configured to detect lighting status of the light sources,
wherein the controller is configured such that, in response to the abnormal state of the at least one light source of the light sources being detected by the detection unit, the controller controls the reading unit so that the reading unit obtains the image of the object on an opposite side with respect to the at least one light source in the abnormal state in the predetermined scanning direction.

3. The image reading device according to claim 1, further comprising a notification unit configured to notify a user to place the object on the opposite side of the at least one light source in the abnormal state.

4. The image reading device according to claim 1, wherein the controller turns off the at least one light source in the abnormal state.

5. The image reading device according to claim 1, wherein:
the illumination unit includes a light guide which diffuses light from the light sources; and
the light sources are provided at both ends of the light guide.

6. The image reading device according to claim 1, wherein:
the illumination unit includes a light guide which diffuses light from the light sources; and
the light sources are provided at one end of the light guide.

7. The image reading device according to claim 1, wherein each of the light sources includes a plurality of light-emitting devices.

8. The image reading device according to claim 7, wherein each of the plurality of light-emitting devices is a light-emitting diode.

9. The image reading device according to claim 7, wherein the plurality of light-emitting devices of each light source are light-emitting diodes respectively corresponding to primary colors of light.

10. The image reading device according to claim 7, wherein the controller uses all the light sources in a case where all the light sources are in a normal state.

11. An image reading device comprising:
an illumination unit configured to diffuse light from light sources in a predetermined scanning direction to illuminate an object with diffused light;
a reading unit having photoreceptors aligned in the predetermined scanning direction to receive light reflected from the object, wherein the reading unit is configured such that the photoreceptors are divided into a plurality of blocks each of which includes more than one photoreceptor; and
a controller that obtains an image of the object by using a normal one of the light sources as a main light source if at least one of the light sources is in an abnormal state,
wherein the controller is able to control the plurality of blocks concurrently, and
the controller operates not to provide a driving signal for one of the plurality of blocks corresponding to a side on which the at least one light source in the abnormal state lies in the predetermined direction.

12. An image reading device, comprising:
an illumination unit configured to diffuse light from light sources in a predetermined scanning direction to illuminate an object with diffused light;
a reading unit having photoreceptors aligned in the predetermined scanning direction to receive light reflected from the object;
a detection unit configured to detect lighting status of the light sources, and
a controller configured such that, in response to the abnormal state of the at least one light source of the light sources being detected by the detection unit, the controller controls the reading unit so that the reading unit obtains the image of the object on an opposite side with respect to the at least one light source in the abnormal state in the predetermined scanning direction.

13. An image reading device, comprising:

an illumination unit configured to diffuse light from light sources in a predetermined scanning direction to illuminate an object with diffused light;

a reading unit having photoreceptors aligned in the predetermined scanning direction to receive light reflected from the object;

a detection unit configured to detect status of the reading unit; and a controller configured such that, in response to an abnormal state in at least a part of the reading unit being detected by the detection unit, the controller controls the reading unit so that the reading unit obtains an image of the object on an opposite side of the at least a part in the abnormal state in the predetermined scanning direction.

14. The image reading device according to claim 13, wherein:

the reading unit has a plurality of reading blocks each of which has photoreceptors aligned in the predetermined scanning direction;

the detection unit detects status of each block; and the controller is configured such that in response to an abnormal state of at least one block of the plurality of reading blocks being detected by the detection unit, the controller controls the reading unit so that the reading unit obtains an image of the object on an opposite side of the at least one block in the abnormal state.

15. The image reading device according to claim 13, wherein the detection unit detects the at least a part of the reading unit is in the abnormal state by detecting a drop in output signals generated by the reading unit.

16. The image reading device according to claim 13, further comprising a notification unit configured to notify a user to place the object on the opposite side of the at least a part in the abnormal state.

* * * * *